(No Model.)
O. KNÖFLER.
TELETHERMOMETER.
No. 452,877. Patented May 26, 1891.
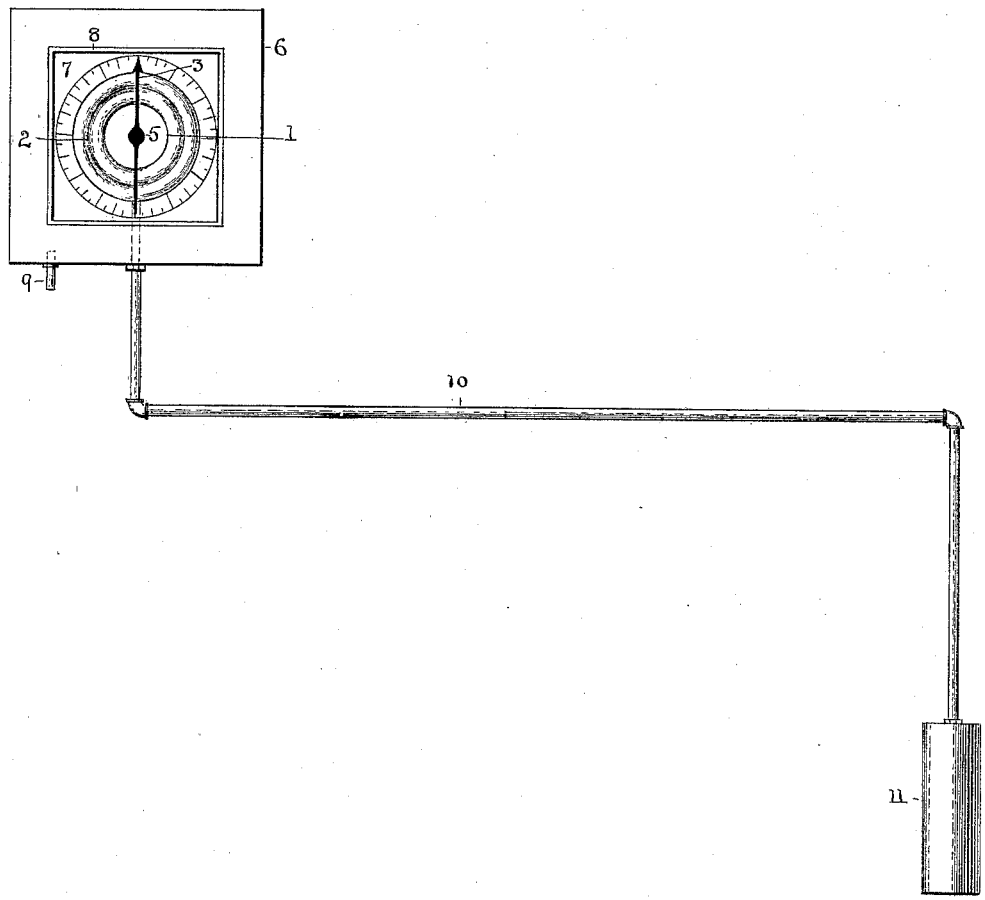
Witnesses
Norris A. Clark.
W. R. Lyon
Inventor
O. Knöfler.
By his Attorneys
Dyer & Seely.

UNITED STATES PATENT OFFICE.

OSKAR KNÖFLER, OF CHARLOTTENBURG, GERMANY, ASSIGNOR OF ONE-HALF TO THE OZONE MANUFACTURING COMPANY, OF NEW YORK, N. Y.

TELETHERMOMETER.

SPECIFICATION forming part of Letters Patent No. 452,877, dated May 26, 1891.

Application filed September 26, 1890. Serial No. 366,194. (No model.) Patented in Germany July 17, 1889, No. 50,684.

*To all whom it may concern:*

Be it known that I, OSKAR KNÖFLER, residing at Charlottenburg, Prussia, Germany, a subject of the Emperor of Germany, have invented a certain new and useful Improvement in Telethermometers, (for which I have obtained Letters Patent in Germany, July 17, 1889, No. 50,684,) of which the following is a specification.

The invention consists in means for rendering manometers, when used as indicators in telethermometers or similar instruments operating by slight changes in the density of air in the instrument, more accurate than heretofore, and especially to provide means whereby the indicator is made independent of variations in external air-pressure at the place where said indicator is situated.

In the accompanying drawing, which illustrates the invention, the figure is a view of an apparatus embodying my improvement.

1 is the body of the manometer, and preferably consists of a metal cup or vessel similar to those employed in certain forms of aneroid barometers. The front and rear faces of this vessel, or either of them, are usually corrugated to increase their elasticity. Such corrugations are indicated at 2.

3 is an index-hand, connected to the apparatus in such manner that the slight rectilinear movements of the sides of the manometer are converted into rotary movements of the axis 5, which supports the index-hand.

6 is a box or case of ceramic or other material, which incases the manometer and which is sealed air-tight. The whole or a part of the case is covered with a glass plate 7, in order to expose to view the index of the manometer. Said plate is preferably laid on an even ledge, prepared therefor in the same manner that glass is placed in an ordinary window-sash, and around the edge is placed a cement or putty, as indicated at 8—for example, a composition consisting of a mixture of wax, colophonium, and alabaster-powder.

9 is a pipe extending through the wall of the case around the manometer. The pipe may conveniently be made of lead, and is for a purpose hereinafter described.

10 is a pipe, such as a lead pipe, which extends from the manometer through a wall of the inclosing vessel by an air-tight joint and extends to an air-thermometer or similar instrument at any suitable distance. This pipe may be, for example, one millimeter in diameter and one hundred meters long. An air-thermometer is represented at 11, and consists of a closed and sealed vessel of cylindrical or other shape, the walls of which are good conductors of heat. This vessel should be of such size that the expansion and contraction of air therein will give the desired movement to the pointer 3.

The operation of the apparatus above described is as follows: By means of an air-exhausting device attached to pipe 9 air is exhausted from the case surrounding the manometer, and pipe 9 is then sealed by being fused and compressed or in any other suitable manner. Changes in temperature in the room or locality where thermometer 11 is located will cause the air therein to expand or contract, and this movement is transmitted by the air in pipe 10 and in the manometer to the pointer, thereby moving the same over the scale, which, when the instrument was made, was correctly calibrated by experiment. Thus the temperature can be read directly from the scale. Since the manometer and indicator are supported in a closed chamber, from which air has been exhausted, the indication given by a definite expansion or contraction of air in the thermometer is always the same. This is not the case when the manometer is supported in the open air, owing to the fact that the pressure of the external atmosphere on the manometer varies at different times to such an extent as to make an error of from one to eighty millimeters in the reading on the scale. Such deviations are practically of no account for manometers used with pressures of several atmospheres, but are fatal in vacuum manometers or manometers used to indicate slight changes of pressure.

The apparatus described has a further advantage, in that the operating parts are completely protected from moisture, dust, &c.

To avoid a slight error arising from variations in temperature in the space around the manometer, the pressure-vessel—that is, the air-thermometer—should be quite large in comparison with the manometer. For instance, the cubic contents of the latter may be one hundred cubic centimeters and of the former one liter, although this proportion is not essential.

It is evident that the thermometer may be placed at any point the temperature of which it is desired to know—such as the hold of a ship, a drying-room, annealing-chamber, &c.—and the manometer may be placed in a convenient position for inspection at a distance from the thermometer, say one hundred meters.

As has already been indicated, a manometer inclosed as described is especially adapted for use as a vacuum-indicator. When so used, a device for changing the degree of exhaustion in the vacuum-chamber would be substituted for the air-thermometer.

Having thus described my invention, what I claim is—

1. The combination of a manometer, an air-tight case inclosing the manometer, a chamber or vessel the pressure in which it is desired to indicate, and a pipe leading from the manometer to said chamber, substantially as set forth.

2. The combination of a manometer, an air-tight exhausted case inclosing the same, an air-thermometer, and a pipe leading from the manometer to said air-thermometer, substantially as set forth.

3. The combination of a manometer consisting of an elastic vessel of the character described, an index therefor, an air-tight exhausted case inclosing the manometer, a glass plate over the index, a chamber the pressure in which it is desired to indicate, and a pipe leading from the manometer to said chamber, substantially as set forth.

4. The combination of a manometer, an air-tight inclosing case, a glass window over the index of the manometer, said window being secured in place by an air-tight connection, a chamber the pressure in which it is desired to indicate, and a pipe leading from the manometer to said chamber, substantially as set forth.

This specification signed and witnessed this 13th day of August, 1890.

OSKAR KNÖFLER.

Witnesses:
 EWALD SAUER,
 MAX KAEHLER.